United States Patent [19]

Kocher

[11] Patent Number: 4,801,125
[45] Date of Patent: Jan. 31, 1989

[54] VALVE BODY COMPRISING SHEET METAL HEMISPHERES AND METHOD FOR MAKING SAME

[75] Inventor: Erich J. Kocher, Milwaukee, Wis.

[73] Assignee: Vilter Manufacturing Corporation, Milwaukee, Wis.

[21] Appl. No.: 668,670

[22] Filed: Nov. 6, 1984

Related U.S. Application Data

[63] Continuation-in-part of Ser. No. 516,684, Jul. 25, 1983, abandoned.

[51] Int. Cl.⁴ ............................................. F16K 27/00
[52] U.S. Cl. ..................................... 251/367; 251/215; 219/121.13; 29/157.1 R
[58] Field of Search .................. 219/121 EB, 124 EC, 219/121 ED; 251/215, 366, 367, 329, 315; 29/434, 157 R, 157.1 R, 157.1 A

[56] References Cited

U.S. PATENT DOCUMENTS

| | | | |
|---|---|---|---|
| 3,433,922 | 3/1969 | McNabb | 219/121 EC |
| 3,592,995 | 7/1971 | Hinrichs | 219/121 EC |
| 3,780,412 | 12/1973 | Millard | 29/157.1 R |
| 3,949,186 | 4/1976 | Nakayama et al. | 219/121 ED |
| 4,376,885 | 3/1983 | Smirra | 29/157.1 R |

FOREIGN PATENT DOCUMENTS

| | | | |
|---|---|---|---|
| 2115870 | 10/1972 | Fed. Rep. of Germany | 219/121 EB |
| 1051099 | 1/1954 | France | 251/215 |
| 1096117 | 6/1955 | France | 251/367 |
| 377517 | 12/1939 | Italy | 251/366 |
| 650748 | 9/1979 | U.S.S.R. | 219/121 ED |

OTHER PUBLICATIONS

Electron Beam Welding—Welding Journal, Aug. 1965, by Brat Kovich, Roth and Purdy.
American Society for Metals, *Metals Handbook*, 8th Ed., (1971), vol. 6, pp. 520, 521, 523, 540 and 541.

Primary Examiner—Samuel Scott
Assistant Examiner—Noah Kamen
Attorney, Agent, or Firm—James E. Nilles; Thomas F. Kirby

[57] ABSTRACT

A large manually operated leak-proof corrosion-proof low-cost shut-off or stop valve for handling high pressure refrigerant liquid and/or gases is disclosed. The valve comprises a valve body formed of two sheet metal hemispheres electron-welded to the periphery of a circular metal valve plate which has an aperture therethrough. Hollow cylindrical metal tubes entend into circular holes formed in the hemispheres and are electron-welded to the hemispheres along the edge of the circular holes. One tube on each hemisphere serves for fluid flow. Another internally and externally threaded tube on one hemisphere serves as valve sleeve through which a manually rotatable and axially shiftable externally threaded valve spindle extends. The inner end of the valve spindle is secured to a valve disc which cooperates with the aperture in the valve plate. In the method, components to be welded together are assembled and rotated with respect to a stationary electron welding beam. The weld is formed solely of melted and resolidified materials from the components being joined. The electron welding beam is applied to the interior of each hemisphere to attach the metal tubes thereto. The electron welding beam is applied to the exterior of each hemisphere to secure it to the metal valve plate. This ensures that a weld extends entirely through the mating surfaces being joined.

4 Claims, 4 Drawing Sheets

VALVE BODY COMPRISING SHEET METAL HEMISPHERES AND METHOD FOR MAKING SAME

BACKGROUND OF THE INVENTION

Field of Use

This application is a Continuation-In-Part Application of U.S. patent application Ser. No. 516,684, filed July 25, 1983 by Erich J. Kocher for Valve Body Comprising Sheet Metal Hemispheres, now abandoned.

This invention relates generally to relatively large manually operated leak-proof and corrosion-proof shut-off or stop valves for handling high pressure liquids and/or gasses such as are used in refrigeration systems or the like, and to methods for making the same.

In particular, the invention relates to a valve body comprising preformed sheet metal hemispheres with a valve plate electron-welded therebetween and with preformed hollow cylindrical tubes electron welded to the edges of holes in the hemispheres to serve as fluid flow tubes and as a valve spindle sleeve and to the method of making the valve body.

Description of the Prior Art

Large industrial and commercial refrigeration systems employ refrigerants, such as ammonia, freon and the like, which are circulated through the system at high pressure in gaseous and liquid form. These refrigerants are costly (presently as much as $12.00 per pound; and a leakage in a large system not only reduces system efficiency but adds to cost of operation. Such systems require relatively large manually operable shut-off or stop valves to control fluid flow. Heretofore, such valves typically comprised either a one-piece cast iron valve body with integrally formed threaded inlet and outlet flow tubes to which threaded pipe ends were connected, or a valve body fabricated of various components secured together by gas or electric welding techniques. U.S. Pat. No. 86,749 shows a cast iron valve body of the aforesaid type. While cast valve bodies, being integral members, reduce the possibilities of leakage, casting is a complex and costly technique requiring separate molds for each valve size. Conversely, prior art valve bodies fabricated of conventionally welded components are complex in design and methods of fabrication, introduce potential weak spots and are not easily kept clean during manufacture. Prior art valves also employed a rotatable valve spindle with a handle wheel on its outer end and a valve disc on its inner end extended from the valve body. Various types of valve spindle stuffing box arrangements were employed to seal against leakage of high pressure past the valve spindle. Also, various valve seating arrangements were employed to ensure proper valve closure. Threaded connections on the valve body, whether cast or welded, very often proved to be prone to fluid loss. Furthermore, valve seat and valve disc designs and valve spindle stuffing box designs, often dictated by the configuration of a cast iron valve body, were susceptible to wear requiring servicing and replacement of seals to prevent leakage. The following U.S. Patents illustrate the state of the art and show various attempts to avoid the use of threaded cast-iron valve housings to provide improved leak-proof valve structures, to improve valve seals, to facilitate repairs and to employ technology aimed at cost reduction. U.S. Pat. Nos. 3,743,246; 4,265,427; 2,895,495 and 1,679,324; Italian patent Nos. 377,517 and 474,630, French patent No. 1,051,099 and Netherlands patent No. 62,271 show gate valve bodies using geometrically shaped conventionally welded sections. U.S. Pat. Nos. 3,580,268, 3,678,556 and 3,518,742 are of a similar thrust. U.S. Pat. Nos. 3,523,551, 3,275,290 4,322,058 and 3,337,183 concern stuffing box arrangements for valve stems.

SUMMARY OF THE INVENTION

In accordance with the invention there is provided a large manually operated leak-proof corrosion-proof low-cost shut-off or stop valve for handling high pressure refrigerant liquids and/or gases. The valve comprises a valve body formed of two sheet metal hemispheres electron-welded to the periphery of a circular steel metal valve plate having a fluid passage therethrough (in the form of a circular hole) and hollow cylindrical steel metal tubes electron-welded to the hemispheres along the edges of circular holes cut in the hemispheres. One tube in each hemisphere serves for fluid flow. Another internally threaded tube on one hemisphere serves as a valve sleeve through which a rotatable and axially shiftable externally threaded valve spindle extends. The inner end of the valve spindle is secured to a valve disc which releasably engages a valve seat around the fluid flow passage in the valve plate. The outer end of the valve spindle is secured to the hub of a hand-wheel which is rotatable to open and close the valve. A removable hollow bonnet on the outer end of the valve sleeve entraps sealing materials to prevent fluid leakage between the valve spindle and the valve sleeve.

A method in accordance with the invention of fabricating the valve generally comprises the steps of: providing a pair of hollow hemispherical metal shells, each shell having at least one circular hole therethrough; providing plurality hollow cylindrical metal tubes, and disposing a tube in each circular hole; effecting an electron beam weld along the joint where the tube meets the shell from the inside of the shell; providing a metal plate having a hole therethrough and disposing the shells on opposite sides of the plate and overlying the hole in the plate; and effecting an electron beam weld along each joint where a shell meets the plate from the outside of the shell.

In carrying out the welding, the electron beam is stationary located in a vacuum and the components to be joined are moved relative to the beam.

Electron beam welding is a commercially available but relatively new method for joining materials. Actual fusion of the surfaces to be joined is achieved by means of a powerful electron beam, focused to a small, precisely controlled spot in a vacuum. No flux or filler is needed. Generated by an "electron gun", the stream of electrons travels at up to 60% of the speed of light. Its kinetic energy is converted into extremely high temperature on impact with the workpiece. Because the power density (watts per square inch) is so high, "impossible" welds can be performed. For example, stainless steel two inches thick can be welded with only 6 kw. of beam power.

A valve and method of making the same in accordance with the invention offers several advantages over the prior art. For example, the spherical valve body and flow tubes are fabricated of seamless sheet metal components which are easy to fabricate from commercially available modular-sized stock materials. Thus, costly casting is eliminated. The valve body, flow tubes, sleeve and holes therefor are of simple geometric shapes arranged in simple balanced geometric relationships thereby simplifying cutting and electron beam welding operations, as well as simplifying the design and construction of jigs and tooling needed for fabrication. The movable components of the valve, such as the valve spindle and its attached valve disc are straight-forward and non-complex in design, easy to manufacture and assemble and are reliable in use. The design an materials of the valve lend themselves to state of the art fabrication techniques such a laser beam cutting and electron beam welding, hereinbefore described. The geometric shapes of the valve components add to the strength of the valve and make it ideal for high pressure applications. Custom design of valves is easy as regards size, the number and location of flow tubes, the location of the valve spindle, and size of the aperture and valve disc. Therefore, limited production runs are possible since expensive molds and castings of various sizes are not required. Different metals and alloys can easily and economically be embodied in the valve, as special environments may dictate. The fabrication steps employed are simple and straight-forward, avoid the need for elaborate jigs and fixtures, and result in a clean finished product.

Electron beam welding overcomes the drawbacks that are found in even the best of conventional welding processes, such as distortion, shrinkage and low joint strength caused by excessive welding heat input; contamination of the weld zone due to impurities in the surrounding atmosphere; inability to weld many materials and combinations of materials; and complete dependence on operator skill to keep the process under control. Furthermore, the total energy requirement for electron beam welding is only about 1/25 that of other types of fusion welding. A 6 kw. (max) machine operating at 2 kw. input can produce the equivalent of work accomplished by a 50 kw. arc welding machine. With deep electron penetration into the material, the technique does not depend on the thermal conductivity of the material, as in other welding methods.

Welds are as strong as the parent material; contamination is eliminated; the process is simple and repeatable; distortion is virtually nil. With low total energy input to the workpiece, distortion and deformation are reduced to an absolute minimum, and there is virtually no effect on physical characteristics of the material. The fusion zone is deep but very narrow as compared with other welding processes—ratios as high as 20:1 are obtained. Also, electron beam welding is an extremely rapid process. Both beam power and spot size can be controlled by simple machine adjustments. The aim of the beam, too, is easily controlled to determine spot position. The high purity of the electron beam process permits welding of reactive materials that are very sensitive to contamination. Electrons have no chemical or material properties, and no mobile foreign atoms are produced. Further, welding is performed in a high vacuum, with foreign atoms reduced to a lower concentration than in the best inert gases available. Other objects and advantages will hereinafter appear.

DRAWINGS

DESCRIPTION OF THE PREFERRED EMBODIMENTS

Figure 1:
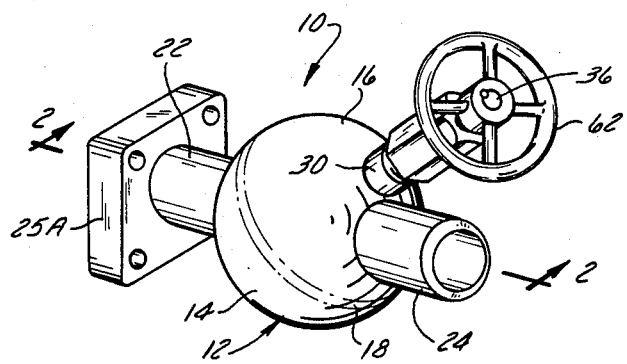
FIG. 1 is a perspective view of a valve in accordance with the invention.
Figure 4:
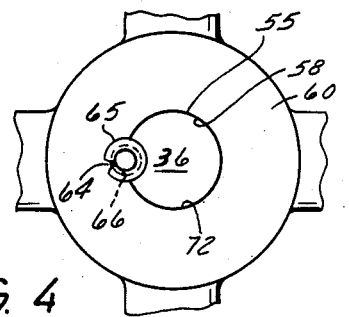
FIG. 4 is an enlarged plan view of a portion of the hand-wheel and its associated spindle and roll pin taken on line 4—4 of FIG. 2.
Figure 2:
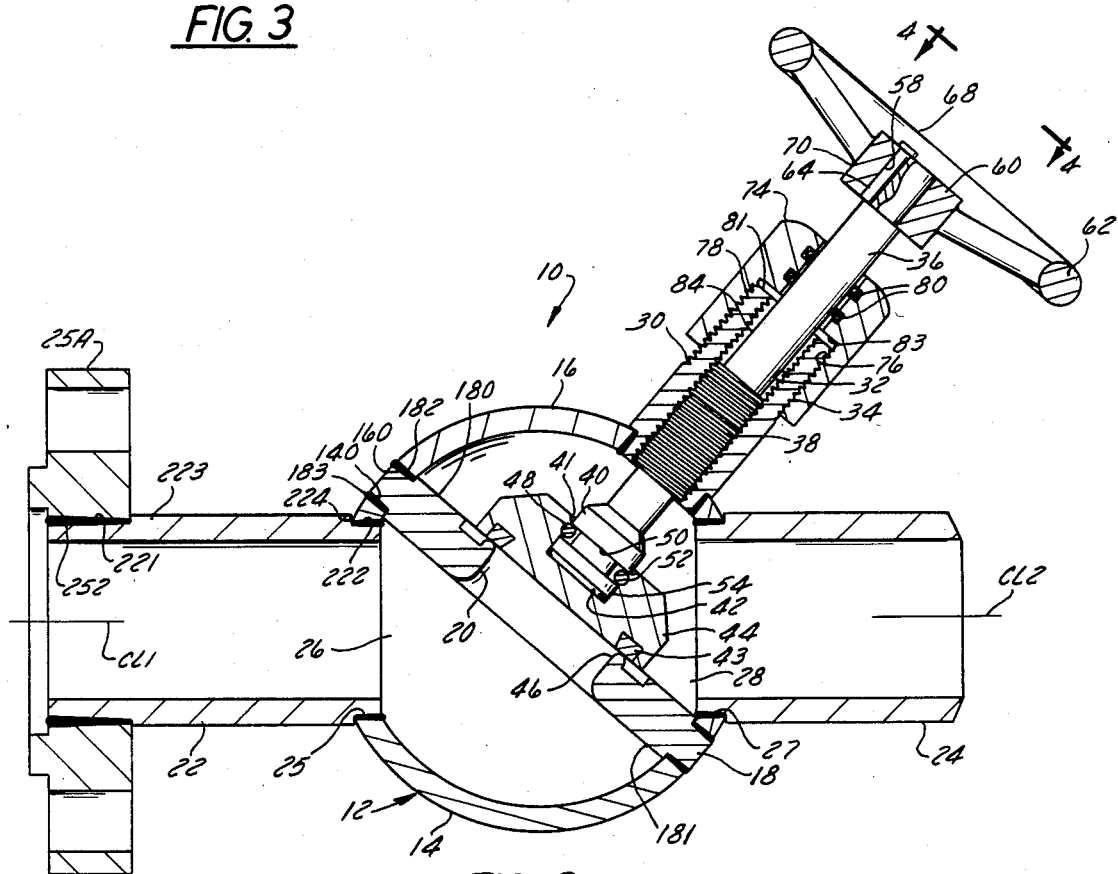
FIG. 2 is an enlarged cross-section view of the valve taken on line 2—2 of FIG. 1.

Referring to FIGS. 1 and 2, there is shown a valve 10 in accordance with the invention. Valve 10 preferably takes the form of a large manually operated leak-proof corrosion-proof low-cost shut-off or stop valve for handling high pressure refrigerant liquids and/or gases such as are used in refrigeration systems. Valve 10 comprises a spherical valve body 12 formed of two sheet metal hemispherical sections 14 and 16 electron beam welded to the periphery of a circular metal valve plate 18 which has a circular flow aperture or fluid passage 20 therethrough. Two hollow cylindrical metal fluid flow tubes 22 and 24 are electron beam welded to the hemispherical sections 14 and 16, respectively, along the edges of circular holes 26 and 28, respectively, which are cut in the sections. Tube 22 has a flange 25A electron beam welded to its outer end.

A hollow cylindrical metal valve spindle sleeve 30, internally and externally threaded as at 32 and 34, respectively, is electron beam welded to hemispherical section 16 along the edge of a circular hole 35 formed in the section. A rotatable and axially shiftable valve spindle 36 extends through sleeve 30 and is externally threaded as at 38 to engage through sleeve 30 and is externally threaded as at 38 to engage the threads 32 in sleeve 30.

The cylindrical inner end 40 of the valve spindle 36 extends into a cylindrical recess 42 in a metal valve disc 44 (having a Babbit metal annular insert 43) which releasably engages a valve seat 46 formed around fluid flow passage 20 in a valve plate 18. The valve disc 44 is secured to the valve spindle 36 by a metal C-ring 48 of circular cross-section which engages an annular groove 50 formed in the periphery of the cylindrical inner end 40 of the valve spindle 36 and a registering annular groove 52 formed in the peripheral wall 54 of the cylindrical recess 42 in the valve disc 44, as FIG. 2 shows. Recess 42 is chamfered as at 41 to facilitate ring insertion.

The cylindrical outer end 56 of the valve spindle 36 extends into a cylindrical bore 58 in the hub 60 of a hand-wheel 62 which is rotatable to open and close the valve. The hand-wheel 62 is secured to spindle 36 by a removable roll pin 64, having a flange 65, which pin fits into a pin hole 66 formed by mating or registering recesses 68 and 70 formed in the periphery of the outer end 56 of the valve spindle 36 and in the peripheral wall 72 of the bore 58 in the hub 60 of the hand-wheel 62, respectively, as FIG. 2 shows.

A hollow bonnet 74 internally threaded a at 76 is screwed on to the external threads 34 on the outer end of the valve spindle sleeve 30 and entraps sealing materials 78 so as to form a seal between the valve spindle 36 and the end of the valve spindle sleeve 30. Bonnet 74 also entraps a plurality of O-rings 80 between the valve spindle 36 and the bonnet 74. Unscrewing of the bonnet 74 affords access to the sealing materials 78 and O-rings 80 and, as the bonnet moves axially, it also axially shifts the hand-wheel 62 off of the outer end 56 of the valve spindle 36. As this occurs, the wheel hub 60 engages the roll pin flange 65 to force the roll pin 64 out of the pin hole 66.

In the embodiment shown in FIG. 2, the sealing or packing material takes the form of a compressible or deformable washer 78 fabricated of packing or stuffing material and disposed around the unthreaded portion 55 of valve spindle 36 and between a flat end surface 81 of sleeve 30 and a flat shoulder or end wall surface 83 in the bore 84 in bonnet 74. The narrower portion 86 of bore 84 through which the unthreaded portion 55 of valve spindle 36 extends is provided with two annular grooves 88 in which the O-rings 80 are located. When the bonnet 74 is screwed down tight, the washer 78 deforms and tightly seals the space between the unthreaded portion 55 of spindle 36 and the wall of the bore 90 in sleeve 30, as well as the space between portion 55 and the narrower bore portion, 86 in the bonnet 74.

FIGS. 1 and 2 show that bonnet 74 has a hex head nut configuration with six flats 94 as regards tool-engaging surfaces whereby the bonnet is screwed and unscrewed.

The components thus far described could be formed of any suitable metal or other materials. But, a valve 10 designed for use with fluids tending to cause rust, corrosion or oxidation should be fabricated of stainless steel. Furthermore, the hemispherical sections 14 and 16, the valve plate 18, the tubes 22 and 24 and the sleeve 30 are preferably formed of seamless materials to enhance their strength in a high pressure system. If preferred, only a single component such as the valve stem could be formed of a stainless steel. The holes 26, 28 and 35 in the body are perfectly circular and are preferably machined or cut by a laser beam. Thus, those pieces of the hemispherical sections 14 and 16 which are removed to form the holes 26, 28 and 35 are geometric shapes defined as "spherical segments". All welds are carried out by electron beam welding so that only material from adjoining components is employed in the weld, rather than extraneous welding material, thereby providing a cleaner, stronger joint and a weld which is more easily carried out.

Figure 3:
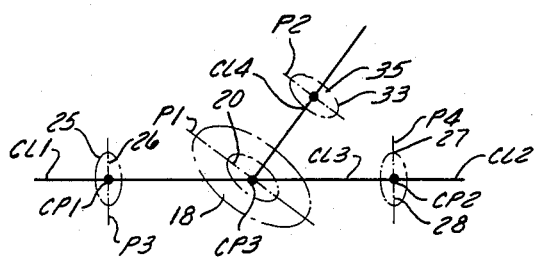
FIG. 3 is a schematic diagram showing the planar and linear relationships of the holes formed in the spherical valve body shown in FIG. 2.

As FIGS. 1, 2 and 3 show, the components forming body 12 of valve 10 are symmetrical and identical in shape and size, in so far as possible, so as to be interchangeable and thereby reduce manufacturing costs. The components are also symmetrically arranged in accordance with basic geometric shapes so as to avoid the problem associated with forming and assembling irregular shapes. Thus, as shown in FIG. 3, the valve plate 18 lies in a first plane P1, the circumferential edge 33 of hole 35 lies in a second plane P2 which is parallel to plane P1, the circumferential edge 25 of the flow hole 26 lies in a third plane P3, and the circumferential edge 27 of the flow hole 28 lies in a fourth plane P4 which is parallel to plane P3. The axial centerlines CL1 and CL2 of the flow tubes 22 and 24 are axially aligned with a centerline CL3 which extends between the centerpoints CP1 and CP2 of the holes 26 and 28. The axial centerline CL4 of sleeve 30 passes through centerpoint CP3 of valve plate 18 (and through the centerpoint of the aperture 20 therein). The centerpoint CP3 is located at the midpoint of centerline CL3. The centerline CL4 lies in a plane which is perpendicular to plane P1. This arrangement of the holes 26, 28 and 35 is the simplest from a geometric standpoint and simplifies jigging the hemispheres and other components during cutting, assembly and welding.

Figure 8:
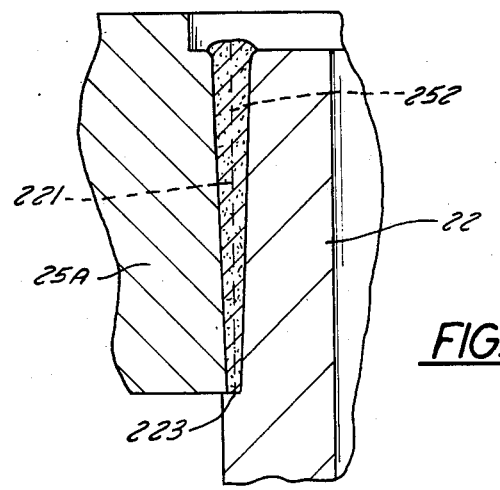
FIG. 8 is a greatly enlarged cross-section view taken on line 8—8 of FIG. 7 and showing the type of weld produced by the machine of FIG. 5.
Figure 6:
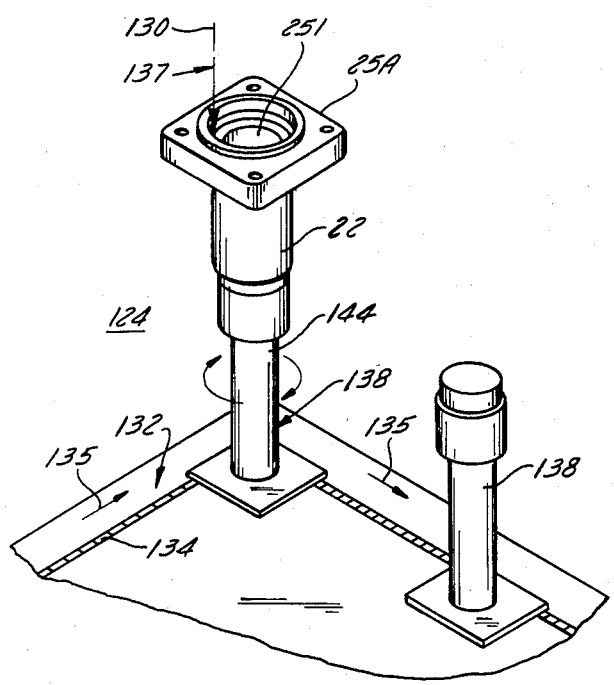
FIG. 6 is an enlarged perspective view of a portion of the conveyor mechanism in the housing of the welding machine of FIG. 5 and shows a combination of valve components disposed thereon for welding.
Figure 7:
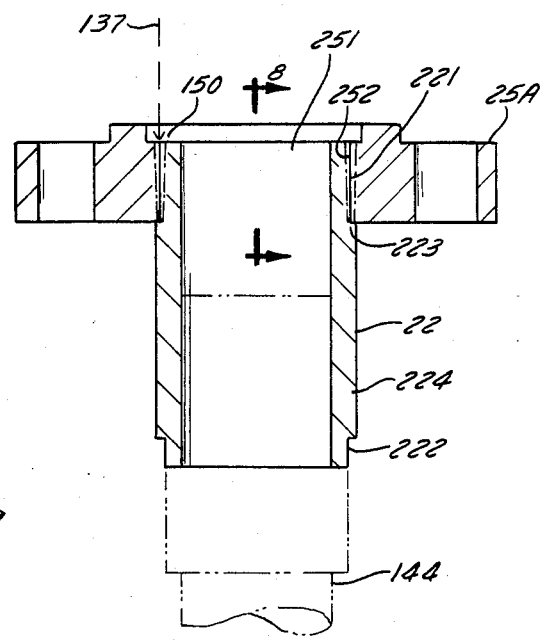
FIG. 7 is an enlarged cross-section view of the components shown in FIG. 6.

As FIGS. 2, 6 and 7 show, tube 22 is machined at its outer and inner ends to provide portions of reduced diameter 221 and 222, respectively, with shoulders 223 and 224, respectively, adjacent thereto. Outer reduced diameter portion 221 of tube 22 is receivable in hole 251 in flange 25A and shoulder 223 serves to support flange 25A on tube 22 during welding, as FIGS. 6 and 7 show. Welding occurs entirely along the abutting surfaces or joint between portion 221 and the surface 252 defining hole 251 in flange 25, as FIG. 8 shows.

Figure 9:
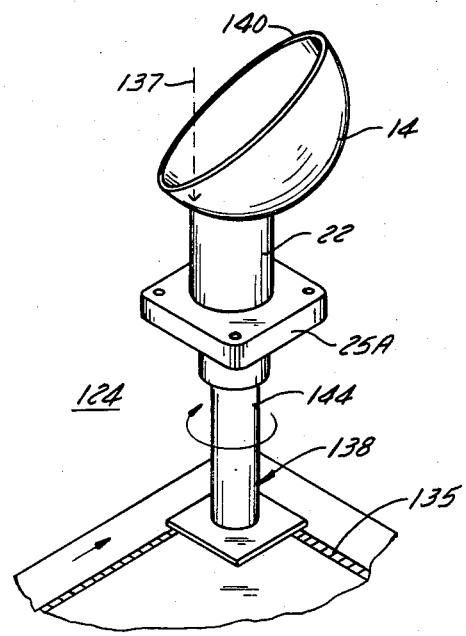
FIG. 9 is an enlarged perspective view of a portion of the conveyor mechanism in the housing of the welding machine of FIG. 5 and shows another combination of valve components disposed thereon for welding.
Figure 10:
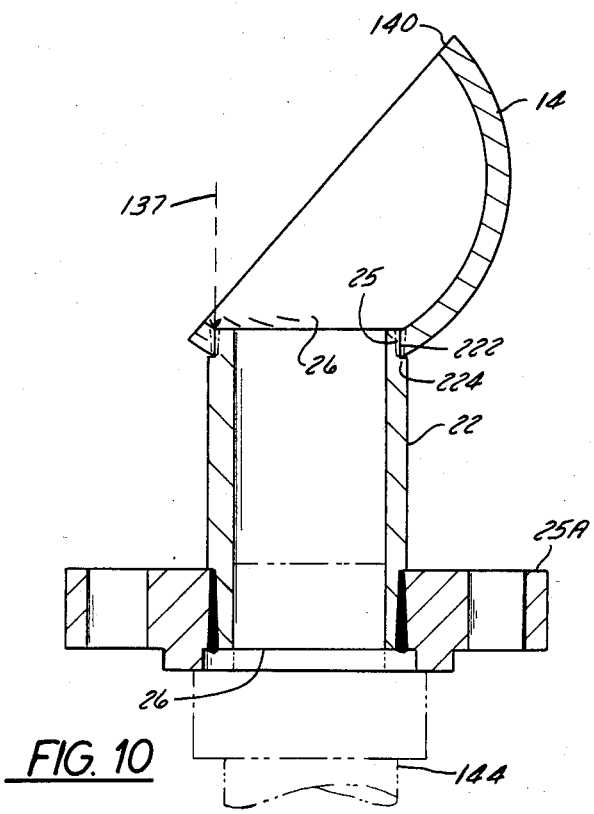
FIG. 10 is an enlarged cross-section view of the components shown in FIG. 9.

As FIGS. 9 and 10 show, inner reduced diameter portion 222 of tube 22 is receivable in hole 26 in shell 14 and shoulder 224 serves to support shell 14 on tube 22 during welding. Welding occurs entirely along the abutting surfaces or joint between portion 222 and the surface 25 defining hole 26 in shell 14, as FIG. 10 shows.

Figure 11:
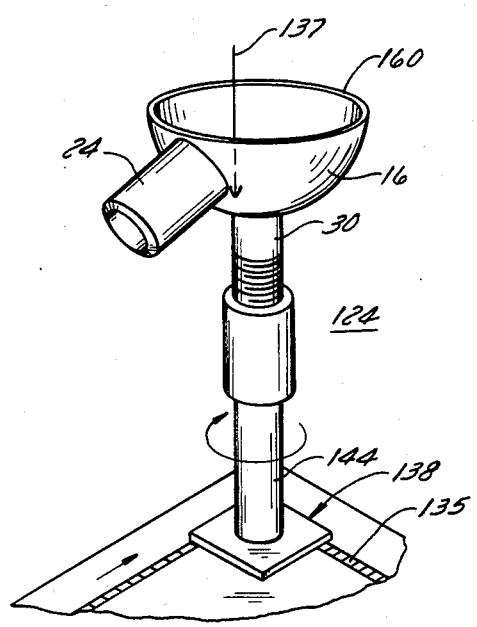
FIG. 11 is an enlarged perspective view of a portion of the conveyor mechanism in the housing of the welding machine of FIG. 5 and shows still another combination of valve components disposed thereon for welding.
Figure 12:
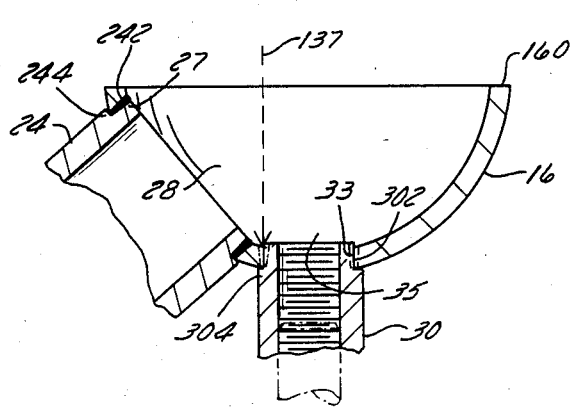
FIG. 12 is an enlarged cross-section view of the components shown in FIG. 11.

As FIGS. 2, 11 and 12 show, tube 24 is machined at its inner end to provide a portion of reduced diameter 242, with a shoulder 244 adjacent thereto. As FIGS. 11 and 12 show, inner reduced diameter portion 242 of tube 24 is receivable in hole 28 in shell 16 and shoulder 244 serves to support shell 16 on tube 24 during welding. Welding occurs entirely along the abutting surfaces or joint between portion 242 and the surface 27 defining hole 28 in shell 16, as FIG. 12 shows.

As FIGS. 2, 11 and 12 also show, tube 30 is machined at its inner end to provide a portion of reduced diameter 302, with a shoulder 304 adjacent thereto. As FIGS. 11 and 12 show, inner reduced diameter portion 302 of tube 30 is receivable in hole 35 in shell 16 and shoulder 304 serves to support shell 16 on tube 30 during welding. Welding occurs entirely along the abutting surfaces or joint between portion 302 and the surface 33 defining hole 35 in shell 16, as FIG. 12 shows.

Figure 13:
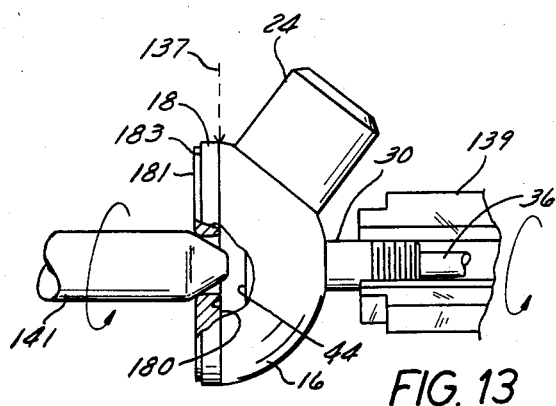
FIG. 13 is a side elevation view of a portion of the fixture mechanism in the housing of the welding machine of FIG. 5 and shows yet another combination of valve components disposed thereon for welding.
Figure 14:
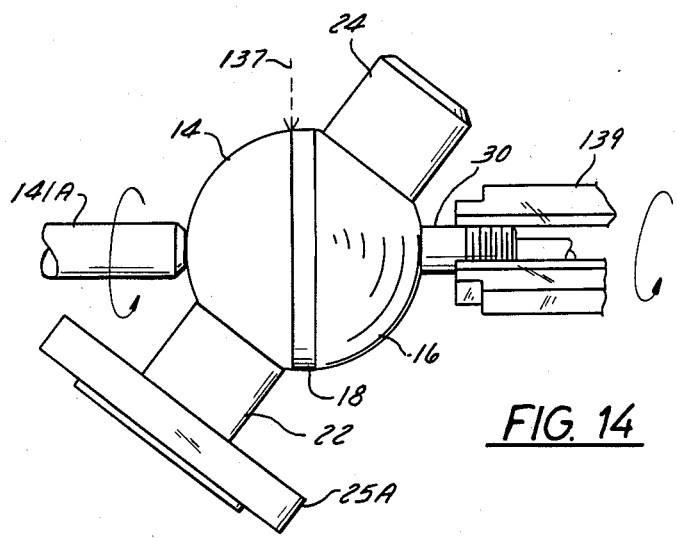
FIG. 14 is a side elevation view similar to FIG. 13 showing a different combination of components.

As FIGS. 2, 13 and 14 show, plate 18 has upper and lower surfaces 180 and 181, respectively, in which annular circumferential grooves 182 and 183, respectively, are formed by machining to accommodate the circumferential edges 160 and 140 respectively, of the shells 14 and 16, respectively. Welding occurs entirely around and along the abutting surfaces or joint between a groove 182 and 183 and associated edge 140 and 160, respectively.

Figure 5:
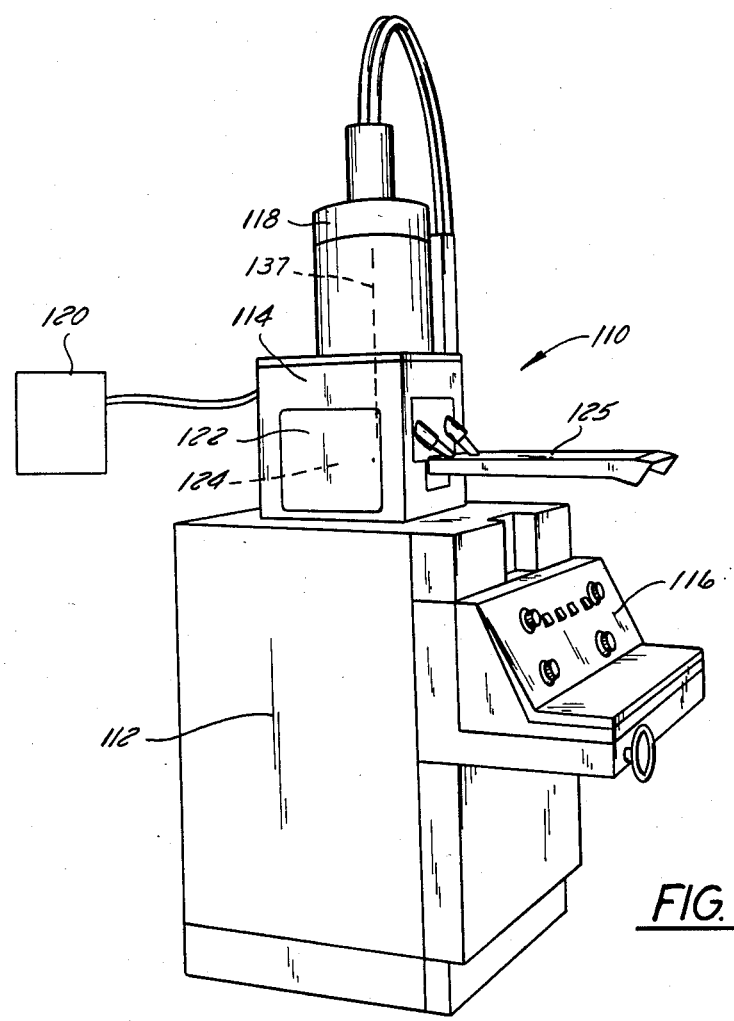
FIG. 5 is a perspective view of an electron beam welding machine employed in fabricating a valve in accordance with the present invention.

As FIGS. 5 through 14 make clear, the several components forming valve 10 are joined together by electron beam welding carried out on an electron beam welding machine 110. As FIG. 5 shows, machine 110 generally comprises a pedestal 112 on which a welding chamber housing 114, an operator's control console 116, electron beam generating apparatus 118 and vacuum-producing apparatus 120 are mounted. Welding chamber housing 114 has a sealable door 122 through which components to be welded are inserted and removed from a welding chamber 124 therein and also has properly shielded viewing apparatus 125 whereby the operator may see inside chamber 124. When in operation, the beam generating apparatus 118 provides a vertically disposed stationary electron welding beam 130 in chamber 124 and the vacuum producing apparatus 120 maintains a vacuum within chamber 124. When generated or produced, beam 130 travels along path 137. Also, as FIGS. 6, 9 and 11 show, disposed within chamber 124 is a movable conveyor 132 by means of which components to be welded are carried and moved into and out of position with respect to beam path 137. Conveyor 132 is understood to be controlled by the operator from the console 116. Conveyor 132 is shown in simplified schematic form and is seen to generally comprise a motor-driven conveyor chain 134 movable along a predetermined path designated by arrows 135 and capable of being stopped and started. Conveyor 132 also comprises one or more fixtures, such as 138 in FIGS. 6, 9 and 11 which are moved along path 125 by chain 134 and upon which the components to be welded are supported. The fixture 38 includes a spindle or portion 144 which is also rotatably movable relative to chain 134 to effect rotation of a component mounted thereon relative to the beam path 137, as FIGS. 6, 9 and 11 show. FIGS. 13 and 14 show a fixture including a rotatable chuck 139 and an associated live center 141 therefor to effect certain motion of components to be welded. Movements of chain 134 and the fixtures thereon or associated therewith are controlled from the control console 116 in accordance with what the operator sees as desirable through the viewing apparatus 125. Certain motions and steps can be pre-programmed but can be manually overridden by the operator, if necessary.

The steps of fabricating valve 10 on machine 110 are as follows. Assume that the components have been cut and shaped as previously explained and are ready to be assembled and welded. Also assume that chamber 124 is vacuumized, (to about 20 microns or less, i.e., to about 1 inch of mercury), that the components to be welded are disposed therein, and that electron welding beam 130 is produced or generated only when components are in proper position relative to the path 137 thereof. The beam 130 is generated at 120 KV and 2 milliamps and its emitter is about 6 inches from the work.

As FIGS. 6 and 7 show, tube 22 with flange 25A fitted thereon is slipped onto spindle 144 of fixture 138 and advanced along path 135 until a point 150 on the circular joint between the tube 22 and flange 25A is aligned with beam path 137. Thereupon, chain 134 is stopped and spindle 144 is rotated for one revolution at a predetermined speed (about 45 linear inches per minute) while the electron 130 is generated and electron beam welding is carried out. As FIG. 8 shows, the weld is not merely at the surface of the joint but extends entirely through the region of contact between metal flange 25 and tube 22.

As FIGS. 9 and 10 show, tube 22 is welded to its respective hemisphere 14 as follows. The tube 22 with its hemisphere 14 fitted thereon is slipped onto spindle 144 of fixture 138, moved to the beam path 137 by conveyor means (not shown) and the weld is carried out as hereinbefore described as rotation of spindle 144 occurs. Tube 24 is welded to hemisphere 16 in the same manner.

As FIGS. 11 and 12 show, tube 30 is welded to hemisphere 16 as follows. Tube 30 with hemisphere 16 fitted thereon is slipped onto spindle 144 of fixture 138, moved to beam path 137 and the weld is carried out as rotation of the spindle and components thereon is carried out.

As FIG. 13 shows, the hemisphere 16 with its tubes 24 and 30 welded thereon and with its valve stem 36 and valve disc 44 installed is mounted on horizontal chuck 139 fixture and the valve plate 18 is held in position against the hemisphere 16 by the rotatable or live center 141. The assemblage is properly positioned relative to the beam path 137 by conveyor means (not shown) and welding is carried out as rotation occurs.

As FIG. 14 shows the other hemisphere 14 with its tube 22 welded thereon is associated with the assemblage described in connection with FIG. 13 and is held in place by a live center 141A. The entire assemblage is properly positioned relative to the beam path 137 and welding is carried out as rotation occurs.

From the foregoing description it is seen that the method of fabricating valve 10 comprises the following steps.

Thus, the following components are provided, namely, metal shells 14 and 16, tubes 22, 24 and 30, plate 18, valve stem 36, valve member 44 and flange 25A. Shell 14 is provided with hole 26, shell 16 is provided with two holes 28 and 35, and plate 18 is provided with aperture 20. Tube 22 is machined to provide portions of reduced diameter 242 at one end. Tube 24 is machined to provide a portion of reduced diameter 242 at one end. Tube 30 is machined to provide a portion of reduced diameter 302 at one end and to provide internal threads 32 and external threads 34.

Tube 22 with flange 25A mounted on one end (FIG. 7) is rotated about a vertical axis with respect to stationary vertical electron beam 130 to provide a weld (FIG. 6). Tube 22 is then reversed and with shell 14 mounted on its other end (FIG. 10) is rotated about a vertical axis with respect to stationary electron beam 130 to provide a weld (FIG. 9). Tube 24 with shell 16 mounted on one end is rotated about a vertical axis with respect to stationary electron beam 130 to provide a weld (FIG. 12). Tube 30 with shell 16 mounted on one end (FIG. 12) is rotated about a vertical axis with respect to stationary electron beam 130 to provide a weld (FIG. 11). Threaded valve stem 36 with valve member 44 thereon is screwed into threaded tube 30 (see FIG. 13). Tube 30 with shell 16 welded thereto and plate 18 clamped thereagainst is rotated about a horizontal axis with respect to stationary vertical electron beam 130 to provide a weld (FIG. 13). Tube 30 with shell 16 welded thereto, with plate 18 welded to shell 16, and with shell 14 clamped against plate 18, is rotated about a horizontal axis with respect to stationary vertical electron beam 130 to provide a weld (FIG. 14). The assemblage of components shown in FIG. 14 is then provided with handle 62 and pin 64 to provide the completed valve 10 shown in FIGS. 1 and 2.

As is apparent, the electron beam 130 is always disposed along stationary vertical path 137 and the components to be welded are moved into that path and rotated with respect to the beam. As a result, all welds must follow a circular path with respect to the components being joined. Furthermore, since the beam 130 follows a straight path, the components to be welded together must not obstruct the beam 130 when presented for welding. Thus, the welds joining the tubes 22, 24 and 30 to the hemispheres 14 and 16 are accomplished by projecting the beam 130 into or against the inside of the hemispheres, whereas the welds joining the hemispheres 14 and 16 to plate 18 are accomplished by projecting the beam 130 against the outside of the hemispheres. In each case, however, the beam 130 penetrates to a depth equal to the thickness of the walls of the hemispheres 14 and 16. Furthermore, the weld is formed by melting and allowing re-solidification of the materials forming the two components being joined. No extraneous welding material or flux is employed and, therefore, the finished weld and welded components remain absolutely clean.

As is also apparent, of the components to be welded, one component (or assemblage of components) is supported on a simple fixture and the other component is supported on (or against) the first component (or assemblage). Thus, no elaborate or highly specialized jigs and fixtures are needed to hold the components together, as is the case in conventional welding of components of unusual shapes. Simple vertical spindles or simple chuck and center devices can be employed.

I claim:

1. A spherical valve comprising:
   a circular valve plate having opposite surfaces and an aperture therethrough between said surfaces, each plate surface having an annular flat-bottomed groove extending inwardly and along its circumferential edge;
   first and second hemispherical sections disposed on opposite sides of said plate and overlying said aperture, each hemispherical section having inner and outer surfaces and a flat circular circumferential edge for engagement with the associated annular flat-bottomed groove in said plate, the first hemispherical section having at least one circular hole therethrough and the second hemispherical section having at least two circular holes therethrough, one of the two circular holes lying in a place parallel to said plate;
   a first electron beam weld joining each hemispherical section to said plate, each first weld extending around said plate and extending inwardly from the exterior of a hemispherical section between the flat circumferential edge of a hemispherical section and the associated annular flat-bottomed groove in said plate;
   a plurality of tubes, each tube having a cylindrical portion with a circular cross-sectional configuration of the same diameter as its associated hole extending into one of said holes and having a shoulder abutting the outer surface of its associated hemispherical section;
   a second electron beam weld joining each tube to a respective hemispherical section and extending outwardly from the interior of a hemispherical section entirely around and between the cylindrical tube portion and the edge of its associated hole;
   a valve spindle mounted for movement in a tube on said second hemispherical section which is disposed perpendicular to said plate;
   and a valve member located between said plate and one of said hemispherical sections and axially movable by said valve spindle relative to said aperture;
   each first and second electron beam weld extending for a distance equal to the thickness between the inner and outer surfaces of an associated hemispherical section and comprised solely melted and re-solidified material from the hemispherical section and from the plate or tube joined to the hemispherical section.

2. A valve according to claim 1 wherein the extended longitudinal axis of each tube passes through the center point of the sphere formed by said hemispherical sections.

3. A valve according to claim 2 wherein said center point is located at the center of said aperture in said plate.

4. A method of making a valve comprising components which are secured together solely by electron bear welds, each weld comprising solely of melted and re-solidified material from two adjacent components, said method comprising the steps of:
   providing a pair of first components, each of which is hemispherically-shaped and have an inner surface, an outer surface and a flat annular rim surface, one hemispherically-shaped first component having a plurality of circular holes therethrough and the other hemispherically-shaped component having at least one circular hole therethrough, each circular hole being defined by a flat annular hole edge surface;
   providing a plurality of cylindrical tubular components, one for each of said circular holes, each tubular component having a cylindrical end portion for insertion within an associated circular hole and for mating engagement with said flat annular hole edge surface and having a shoulder adjacent thereto for engaging the outer surface of an associated hemispherically-shaped first component to limit insertion of said end portion into its associated hole;
   providing a circular valve plate component having opposite surfaces and an aperture therethrough, each one of said opposite surface having an annular groove extending around the circumferential edge of said valve plate component, each groove extending radially inwardly from said circumferential edge and having a flat bottom surface for mating engagement with said annular rim surface of an associated hemispherically-shaped first component;
   mounting a tubular component on the outer surface of a hemispherically-shaped first component so that the end portion of the tubular component extends into a circular hole and the shoulder engages the outer surface of the associated hemispherically-shaped first component;
   directing an electron welding beam into the interior of a hemispherically-shaped first component on which a tubular component is mounted and effecting relative motion between the beam and the hemispherically-shaped fist component so as to effect an electron beam weld along and around a flat hole edge surface and a mating cylindrical end portion of a tubular component and so that the weld penetrates outwardly from the inner surface toward the outer surface of the hemispherically-shaped first component, repeating the steps of mounting and directing until all of said tubular components have been electron beam welded;

disposing a hemispherically-shaped first component with all of its tubular components welded thereon on one side of said circular valve plate component so that the flat annular rim surface of the hemispherically-shaped first component engages the flat bottom surface of the annular groove on said one side of said circular valve plate;

projecting an electron welding beam toward the exterior of the hemispherically-shaped first component which is disposed on said one side of said circular valve plate and effecting relative motion between the beam and the circular plate component with the hemispherically-shaped first component disposed thereon so as to effect an electron beam weld along and around a flat annular rim surface and the mating flat bottom surface of a groove and so that the weld penetrates inwardly from the outer surface toward the inner surface of the hemispherically-shaped first component;

and repeating the steps of disposing and projecting until both hemispherically-shaped first components have been welded to said valve plate component.

* * * * *